United States Patent
Verdegan et al.

(10) Patent No.: US 8,114,299 B2
(45) Date of Patent: Feb. 14, 2012

(54) FILTER WITH FLOW SURGE PROTECTION AND METHOD OF PROTECTING FILTER FROM FLOW SURGE

(75) Inventors: Barry M. Verdegan, Stoughton, WI (US); Chad M. Thomas, Algood, TN (US); Ted S. Loftis, Stoughton, WI (US); Charles W. Hawkins, Sparta, TN (US); Melvin D. McCormick, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1022 days.

(21) Appl. No.: 12/038,957

(22) Filed: Feb. 28, 2008

(65) Prior Publication Data
US 2009/0218295 A1    Sep. 3, 2009

(51) Int. Cl.
*B01D 27/10* (2006.01)
*B01D 35/00* (2006.01)
*B01D 37/00* (2006.01)

(52) U.S. Cl. .......... 210/767; 210/130; 210/349

(58) Field of Classification Search .......... 210/130, 210/349, 767
See application file for complete search history.

(56) References Cited

U.S. PATENT DOCUMENTS

| | | |
|---|---|---|
| 2,864,403 A | 12/1958 | Deily et al. |
| 3,786,920 A | 1/1974 | Raymond |
| 4,256,579 A | 3/1981 | Rose et al. |
| 4,287,917 A | 9/1981 | Frey |
| 4,911,204 A | 3/1990 | Martin |
| 5,549,821 A | 8/1996 | Bounnakhom et al. |
| 5,722,358 A | 3/1998 | Fuesser et al. |
| 5,906,736 A | 5/1999 | Bounnakhom et al. |
| 6,019,229 A | 2/2000 | Rao |
| 6,318,329 B1 | 11/2001 | Sato |
| 6,974,538 B2 | 12/2005 | Baumann et al. |
| 2005/0000876 A1 | 1/2005 | Knight |
| 2005/0077230 A1* | 4/2005 | Jokschas et al. .......... 210/446 |
| 2006/0118480 A1 | 6/2006 | Inoue |
| 2006/0196156 A1 | 9/2006 | Thomas et al. |
| 2007/0102052 A1 | 5/2007 | Yoshihara et al. |

* cited by examiner

*Primary Examiner* — Chester Barry
(74) *Attorney, Agent, or Firm* — Andrus, Sceales, Starke & Sawall, LLP

(57) ABSTRACT

Fluid flow surge protection is provided for a filter by increasing upstream plenum fluid volume. In one embodiment, an accumulator or transfer mechanism transfers or trades downstream plenum fluid volume to or for upstream plenum fluid volume.

26 Claims, 8 Drawing Sheets

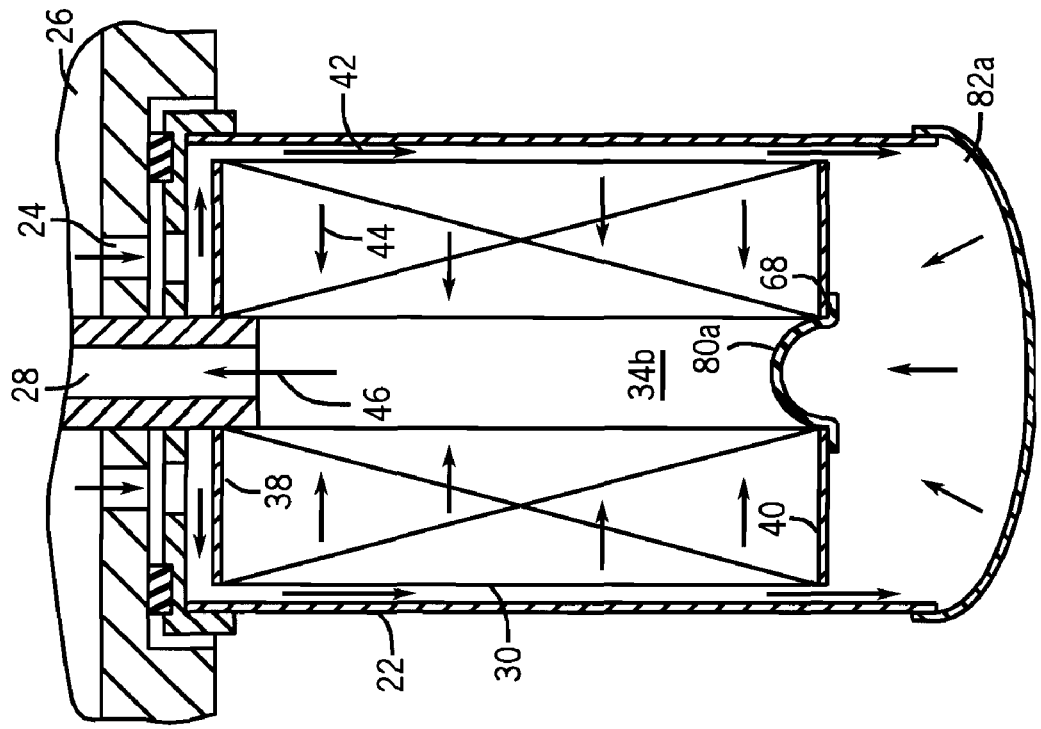
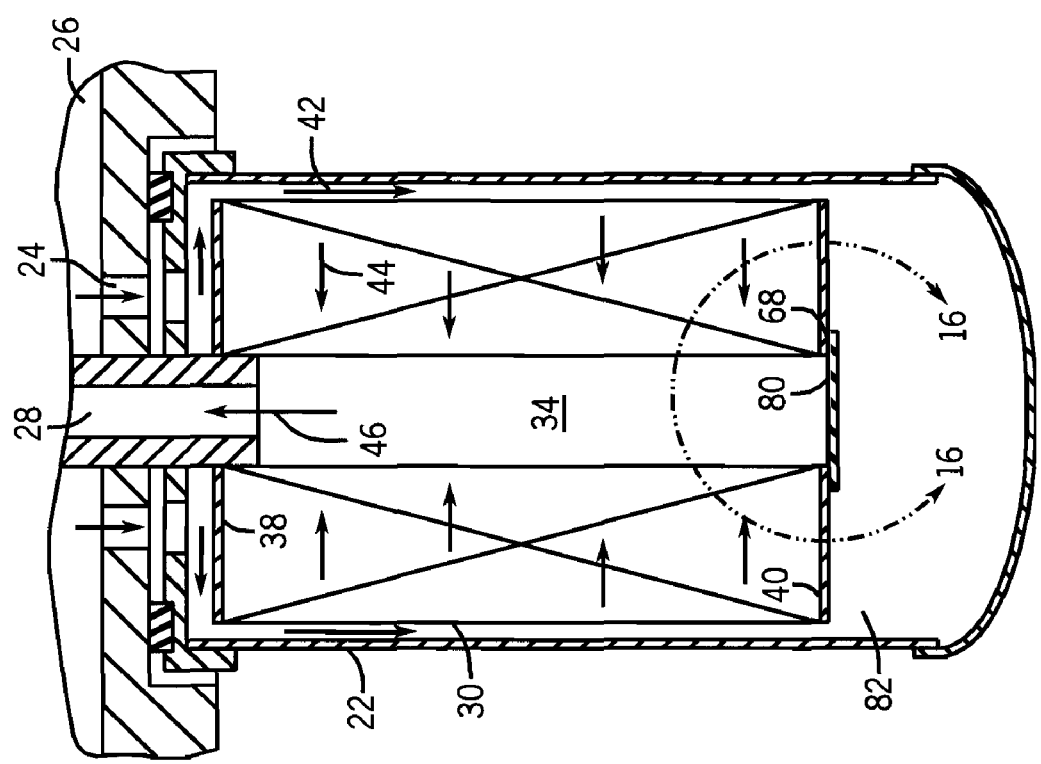

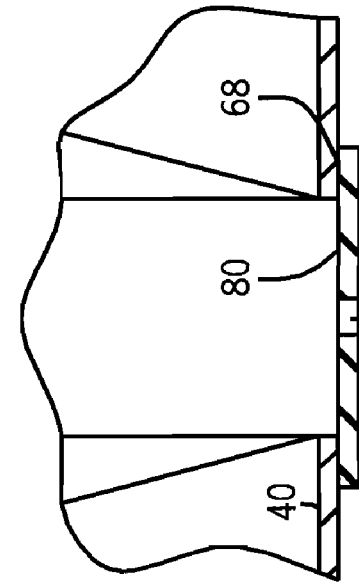
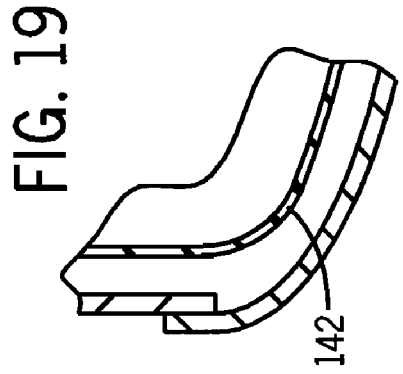
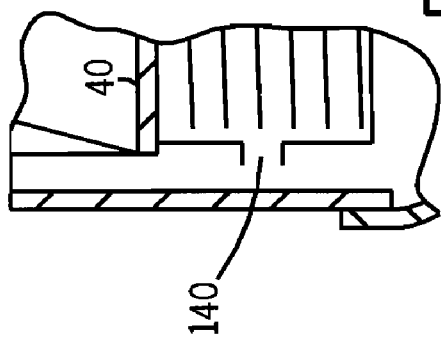
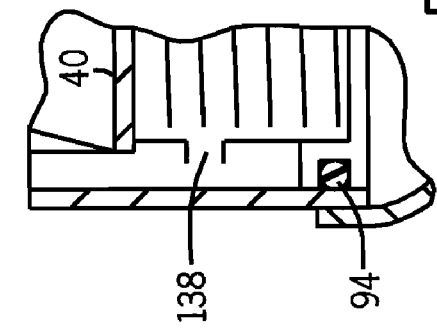
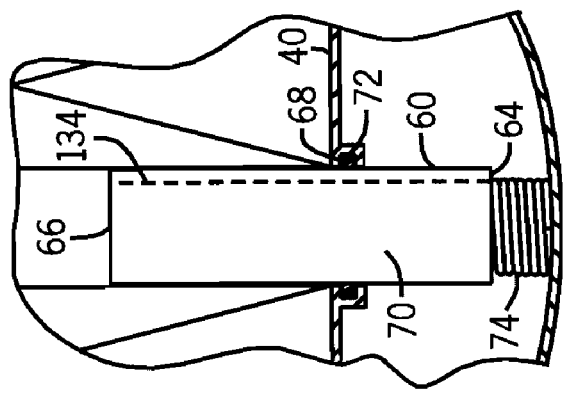

FILTER WITH FLOW SURGE PROTECTION AND METHOD OF PROTECTING FILTER FROM FLOW SURGE

BACKGROUND AND SUMMARY

The invention relates to filters and filtering methods, and more particularly to flow surge protection and further particularly in some embodiments with combined vibration dampening.

During filtration, contaminant removal can be adversely affected by changes in the fluid flow rate through the filter, especially abrupt changes, e.g. as experienced by rapid acceleration or start-up in internal combustion engine applications. Contaminate removal can also be adversely affected by vibration.

The present invention arose during continuing development efforts directed toward the above problems.

BRIEF DESCRIPTION OF THE DRAWINGS

FIG. 7 is like FIG. 1 and shows another embodiment.
FIG. 8 is like FIG. 7 and shows a further operational condition.
FIG. 15 shows an enlarged portion of FIG. 5 and illustrates a further embodiment.
FIG. 16 shows an enlarged portion of FIG. 7 and illustrates a further embodiment.
FIG. 17 shows an enlarged portion of FIG. 9 and illustrates a further embodiment.
FIG. 18 shows an enlarged portion of FIG. 11 and illustrates a further embodiment.
FIG. 19 shows an enlarged portion of FIG. 13 and illustrates a further embodiment.

DETAILED DESCRIPTION

Figure 1:
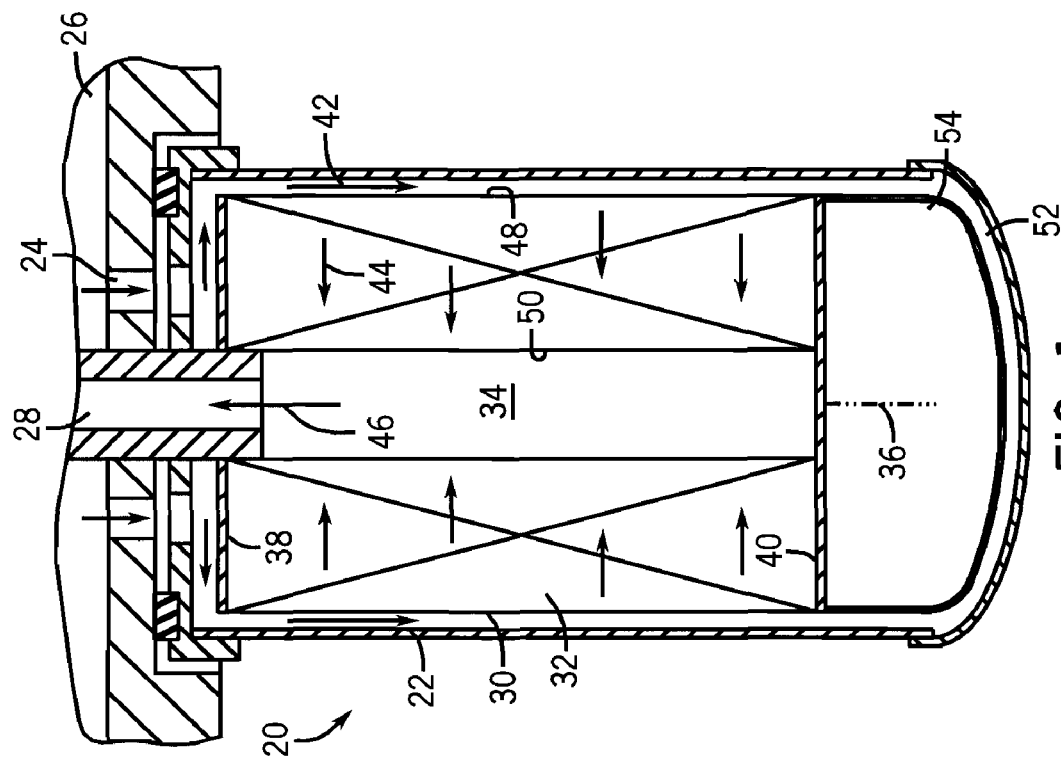
FIG. 1 is a schematic sectional view of a filter in accordance with the invention.

FIG. 1 shows a filter 20 including a housing 22 having an inlet 24 receiving dirty fluid to be filtered, e.g. lubricating oil from an internal combustion engine 26, though other fluids and applications may be used, and an outlet 28 discharging clean filtered fluid, e.g. back to the engine. A filter element 30 in the housing filters the fluid. In one nonlimiting example, the filter element includes annular filter media 32 having a hollow interior 34 extending axially along axis 36 between first and second axially distally opposite endcaps 38 and 40, as is known. The fluid flows from inlet 24 and then axially downwardly in the orientation of FIG. 1 as shown at arrows 42 and then radially inwardly as shown at arrows 44 through filter media 32 into hollow interior 34 and then axially upwardly as shown at arrow 46 to outlet 28, all as is known. Filter element 30 has an upstream side 48 receiving fluid along upstream flow path 42 from inlet 24. Filter element 30 has a downstream side 50 discharging fluid along downstream flow path 46 to outlet 28. The housing has an upstream plenum 52 communicating with upstream side 48 of the filter element. The housing has a downstream plenum at 34 communicating with the downstream side 50 of the filter element.

Figure 2:
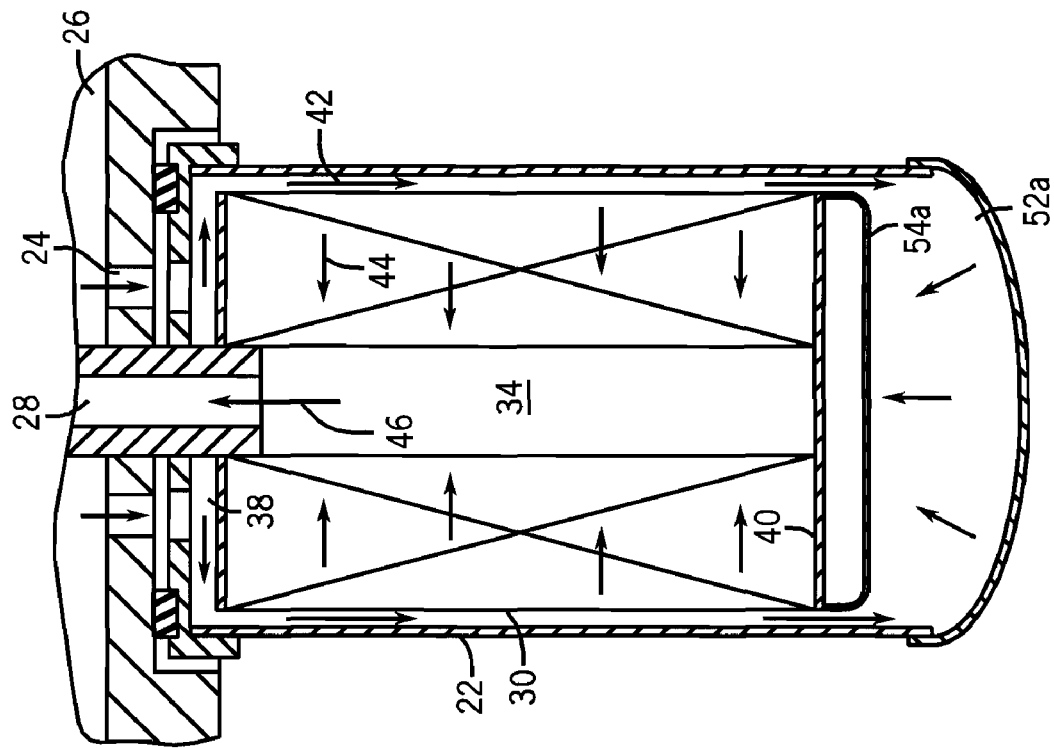
FIG. 2 is like FIG. 1 and shows a further operational condition.

A resiliently compressible accumulator 54 occupies substantially the entire volume of upstream plenum 52 and is responsive to a fluid flow surge to compress to a smaller volume as shown at 54a in FIG. 2, and increase remaining fluid volume 52a of the upstream plenum. In internal combustion engine applications with the oil pump upstream of the filter, the fluid flow surge can be caused by increasing fluid flow pressure at inlet 24 caused by sudden or rapid acceleration of the engine or at start-up of the engine, etc. In various applications, fluid flow surges may be caused by various conditions, including a given pressure differential between inlet 24 and outlet 28 and/or a given pressure drop across filter element 30, including in applications with upstream and/or downstream pumps causing high pressure at inlet 24 and/or low pressure or suction at outlet 28. Accumulator 54 is provided by a hollow cushioning envelope, e.g. a bag, shroud, bellows, accordion, by way of nonlimiting example, filled with a compressible medium, e.g. gas or some other medium. The envelope has a normal expanded condition, FIG. 1, substantially filling upstream plenum 52. The envelope has a contracted condition, FIG. 2, leaving a remainder volume 52a in the upstream plenum between the housing and the envelope. Envelope 54 shrinks from the normally expanded condition of FIG. 1 to the contracted condition of FIG. 2 in response to the fluid flow surge to absorb and accommodate the abrupt pressure change and shock wave, and also to dampen vibration, either of which can adversely affect filtration, e.g. by causing particle re-entrainment back into the fluid being filtered, or degrading the structural integrity of the filter.

Figure 3:
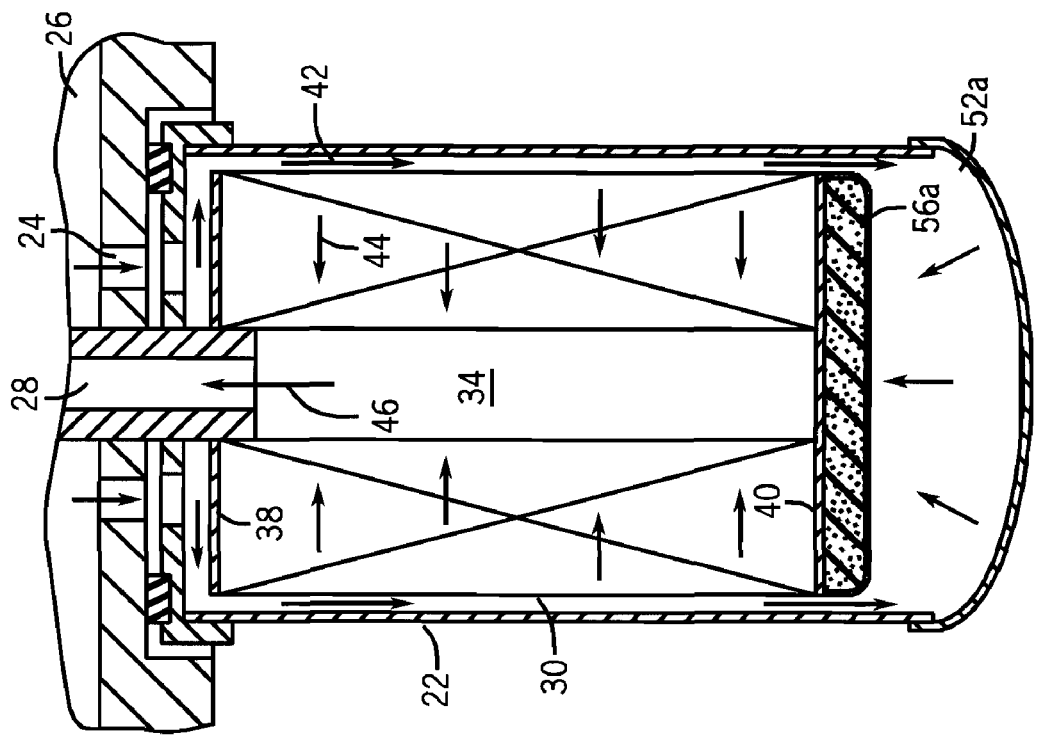
FIG. 3 is like FIG. 1 and shows another embodiment.
Figure 4:
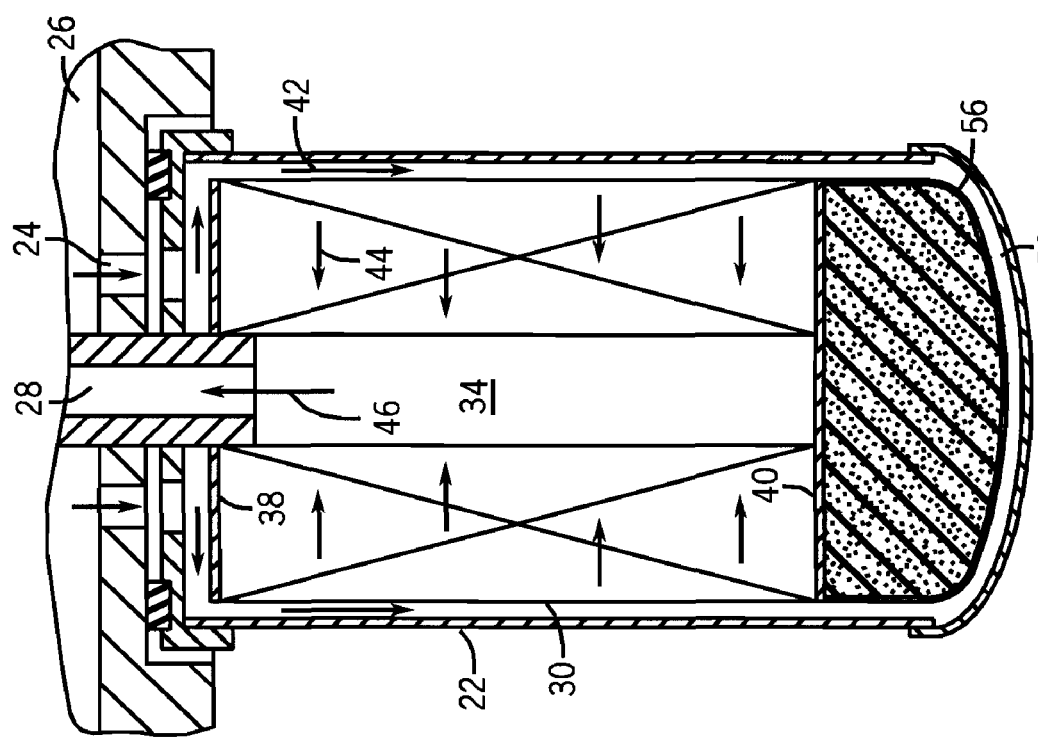
FIG. 4 is like FIG. 3 and shows a further operational condition.

FIGS. 3 and 4 show a further embodiment and use like reference numerals from above where appropriate to facilitate understanding. In FIG. 3, the accumulator is provided by a compressible foam cushion 56 having a normally expanded condition as shown in FIG. 3, and having a compressed contracted condition as shown at 56a in FIG. 4 in response to the fluid flow surge. The additional volume 52a accommodates and absorbs the surge fluid flow, to thus provide surge protection for the filter, and also to dampen vibration. The embodiments of FIGS. 1-4 are preferred where the fluid flow surge is caused by an abrupt or sudden pressure increase at inlet 24, e.g. by an upstream pump.

Figure 5:
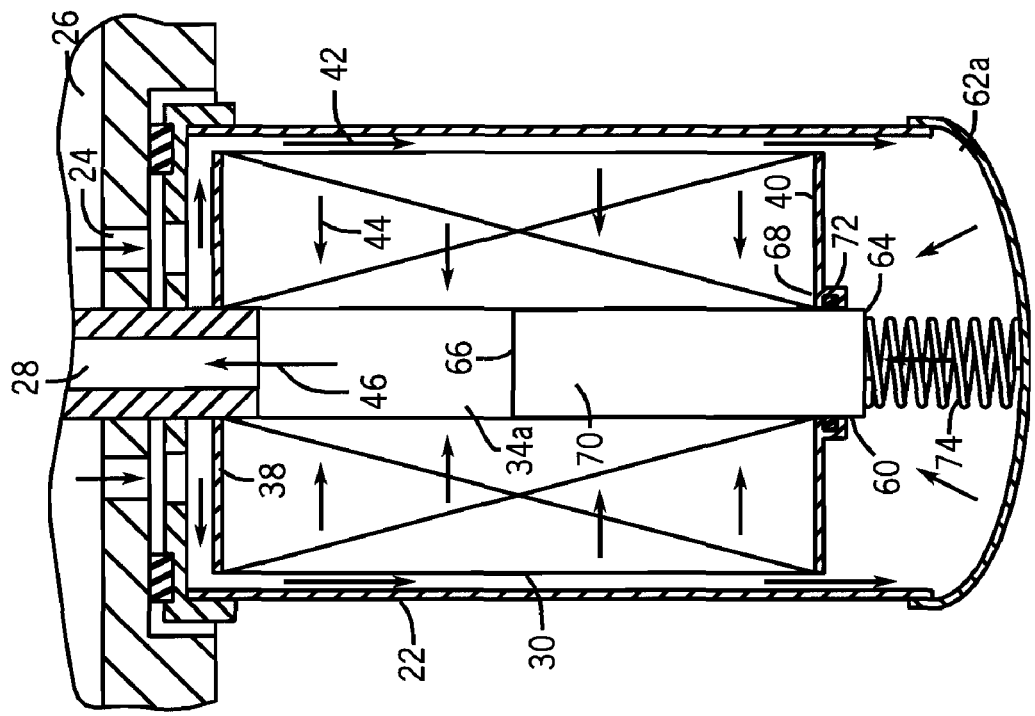
FIG. 5 is like FIG. 1 and shows another embodiment.
Figure 6:
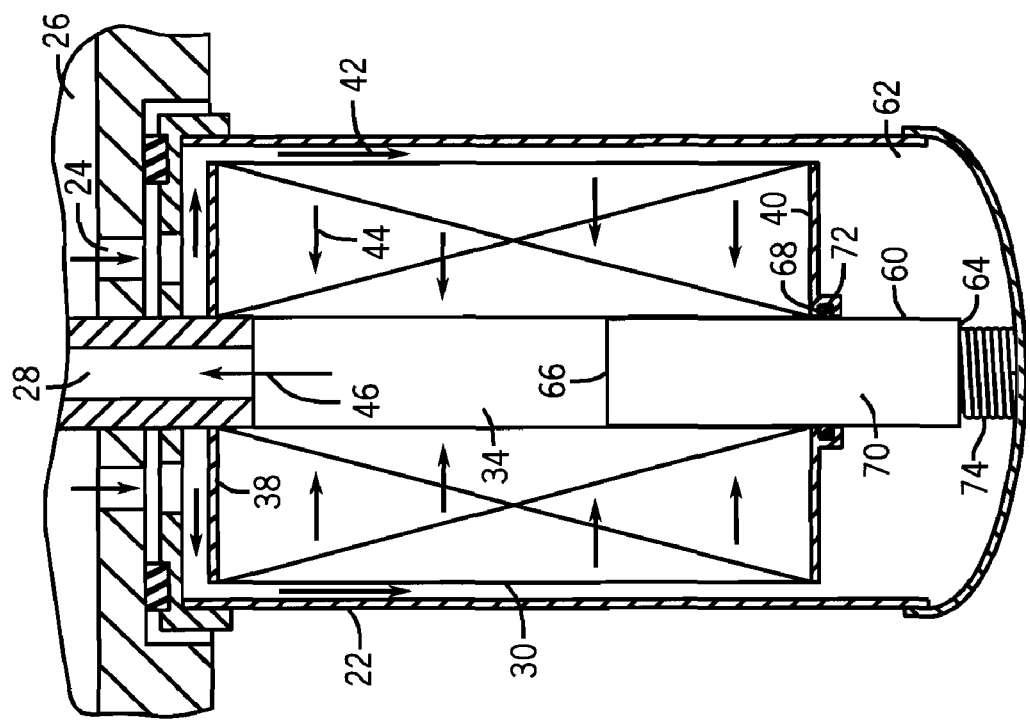
FIG. 6 is like FIG. 5 and shows a further operational condition.

FIGS. 5 and 6 show a further embodiment and use like reference numerals from above where appropriate to facilitate understanding. The embodiment of FIGS. 5, 6 is preferred where the filter is subject to a sudden or abrupt differential pressure between inlet 24 and outlet 28, regardless of whether caused by an upstream or downstream pump, or the like. A transfer mechanism 60 is movable along a given path, e.g. axially upwardly from the position of FIG. 5 to the position of FIG. 6, in response to a fluid flow surge to provide an accumulator and increase the fluid volume of upstream plenum 62 by reducing the fluid volume of downstream plenum 34. For example, upon upward axial movement of transfer mechanism 60 from the position of FIG. 5 to the position of FIG. 6, the fluid volume of upstream plenum 62 increases to 62a as seen in FIG. 6, and the fluid volume of downstream plenum 34 decreases to 34*a* as seen in FIG. 6. Transfer mechanism 60 moves in a direction (e.g. upwardly in FIG. 5) out of upstream plenum 62 and into downstream plenum 34 in response to the fluid flow surge, to transfer available fluid volume from downstream plenum 34 to upstream plenum 62 by trading available downstream plenum fluid volume for available upstream plenum fluid volume. The upstream plenum fluid volume and the downstream plenum fluid volume are in one embodiment inverse monotic functions of each other in response to movement of transfer mechanism 60. In one embodiment, the transfer mechanism is a movable barrier dividing the upstream and downstream plenums 62 and 34 from each other. The transfer mechanism has an upstream face 64 facing upstream plenum 62 and contacted by fluid therein. The transfer mechanism has a downstream face 66 facing downstream plenum 34 and contacted by fluid therein. In one embodiment, endcap 40 has an aperture 68 therethrough, and the transfer mechanism is a piston 70 axially slidable up-down through aperture 68 in sealed sliding relation at gasket 72, e.g. provided by an O-ring or the like preventing mixing of dirty upstream fluid and clean downstream fluid. Piston 70 moves in an upward axial direction toward hollow interior 34 to decrease the downstream plenum fluid volume and increase the upstream plenum fluid volume. Piston 70 moves in a downward axial direction away from hollow interior 34 to increase the downstream plenum fluid volume and decrease the upstream plenum fluid volume. A biasing member, preferably a tension spring 74 biases piston 70 in the downward axial direction to the position shown in FIG. 5. In response to a fluid flow surge causing the pressure on face 64 to overcome the bias of spring 74, and the piston moves axially upwardly to the position shown in FIG. 6, to increase the upstream plenum fluid volume as shown at 62*a*, and decrease the downstream plenum fluid volume as shown at 34*a*. In various embodiments, it is preferred that piston 70 be biased by a biasing member or be self-biased in order that such bias must first be overcome by a given fluid flow surge before piston 70 moves axially upwardly, to prevent false triggering movement of the piston in response to low level fluid flow surges, whereby the piston only moves in response to a fluid flow surge above a designated level where it is desired that the piston and its accumulator function be actuated. For example, it may be desired to avoid triggering or actuating the accumulator merely in response to gradual increasing pressure drop across the filter element as it begins plugging with contaminant during its normal lifetime operation, i.e. normal aging.

FIGS. 7 and 8 show another embodiment and use like reference numerals from above where appropriate to facilitate understanding. In FIG. 7, the noted transfer mechanism and accumulator is a flexible diaphragm 80 spanning aperture 68 and flexing in an upward axial direction to the position shown in FIG. 8 toward hollow interior 34 to decrease the downstream plenum fluid volume as shown at 34*b*, and to increase the fluid volume of the upstream plenum 82 as shown at 82*a*. Diaphragm 80 flexes upwardly as shown at 80*a* in response to a fluid flow surge. At the end of a fluid flow surge, diaphragm 80 flexes back downwardly, preferably by its own inherent or self-bias, or otherwise to its natural or normal condition, from the position of FIG. 8 to the position of FIG. 7 away from hollow interior 34 to increase the downstream plenum fluid volume and decrease the upstream plenum fluid volume.

Figure 9:
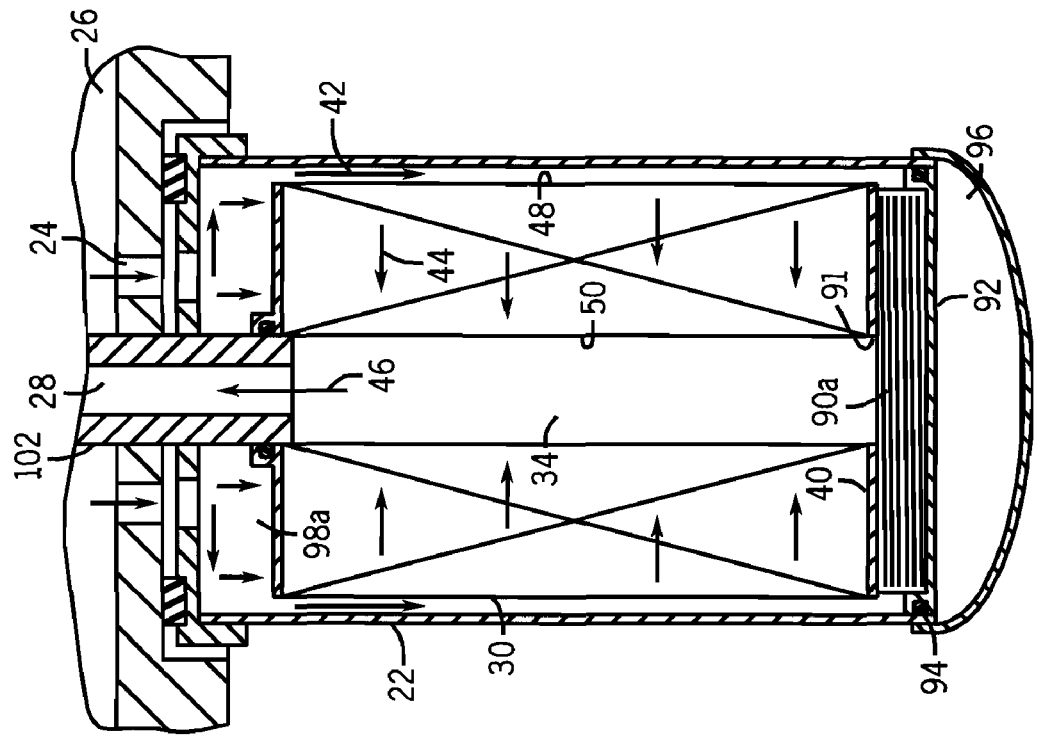
FIG. 9 is like FIG. 1 and shows another embodiment.
Figure 10:
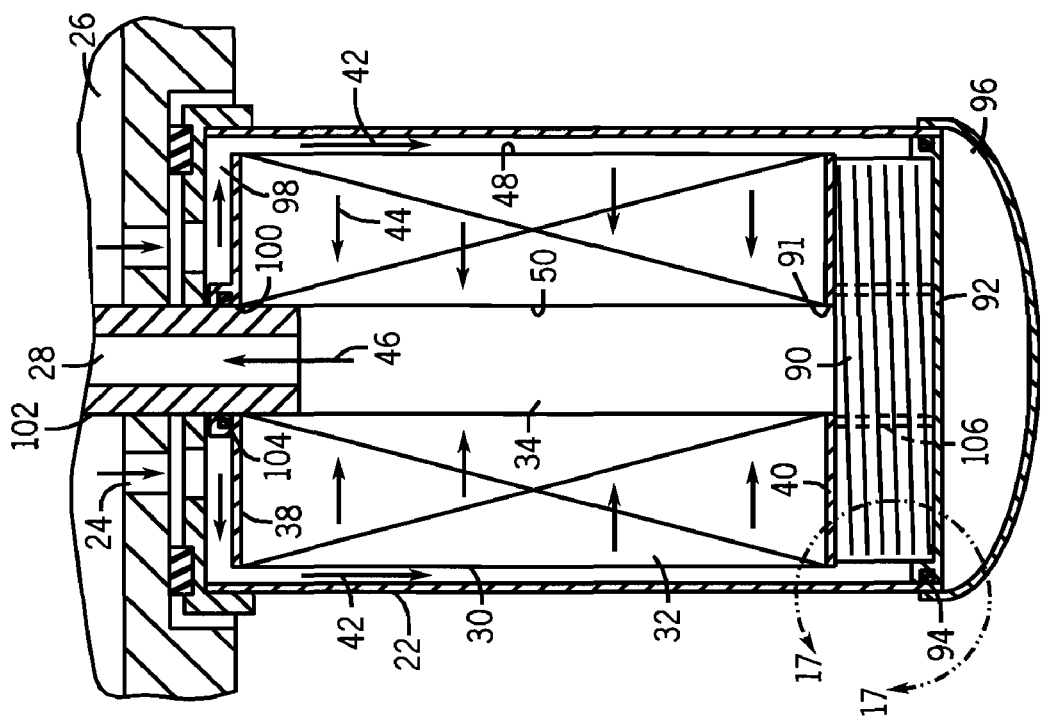
FIG. 10 is like FIG. 9 and shows a further operational condition.

FIGS. 9 and 10 show another embodiment and use like reference numerals from above where appropriate to facilitate understanding. Downstream plenum 34 includes a section 90 at lower endcap 40 on the opposite axial side thereof from filter media 32. Downstream plenum section 90 communicates with the remainder of downstream plenum 34 through aperture 91 in lower endcap 40. In one embodiment, downstream plenum section 90 is provided by a hollow cushioning envelope, bag, bellows, etc. having a lower stationary plate 92 fixed and sealed to the housing at gasket 94, such that lower chamber 96 is isolated from and not in communication with upstream flow path 42. Upstream plenum 98 is at upper endcap 38 on the opposite axial side thereof from filter media 32. Upper endcap 38 has an aperture 100 therethrough. Outlet 28 includes a stationary tube 102 extending axially downwardly through aperture 100 and sealed thereto by gasket 104, e.g. an O-ring or the like, in axial sliding relation enabling up-down movement of the filter element along stationary tube 102 in sealed relation. Upstream plenum 98 is on the opposite axial side of endcap 38 and gasket 104 from hollow interior 34. In response to a fluid flow surge, filter element 30 moves in a downward axial direction from the position of FIG. 9 to the position of FIG. 10 to decrease the downstream plenum fluid volume at 90 to that shown at 90*a* as shown in FIG. 10, and to increase the upstream plenum fluid volume from 98 to 98*a* as shown in FIG. 10. Upon termination of the fluid flow surge, filter element 30 moves in a second opposite axial direction, i.e. upwardly from the position of FIG. 10 to the position of FIG. 9, to increase downstream plenum fluid volume from 90*a* to 90, and to decrease upstream plenum fluid volume from 98*a* to 98. In a desirable aspect of one embodiment, downstream plenum section 90 communicates with the remainder of the downstream plenum at hollow interior 34 through aperture 91 in lower endcap 40 and provides an accumulator in the downstream plenum responsive to the fluid flow surge to increase the fluid volume of the upstream plenum and decrease the fluid volume of the downstream plenum. The accumulator at 90 receives clean filtered fluid from the downstream side 50 of filter element 30. Accumulator 90 has a normally expanded condition as shown in FIG. 9 at least partially filled with clean filtered fluid. The accumulator has a contracted condition as shown in FIG. 10 discharging clean filtered fluid to downstream side 50 of the filter element. Accumulator 90 is at endcap 40 on the opposite axial side thereof from filter media 32. Accumulator 90 communicates with hollow interior 34 through aperture 91 in lower endcap 40. In some embodiments, it is desired that the accumulator 90 be biased to its expanded condition of FIG. 9, for example by a biasing spring such as shown in dashed line at 106. In other embodiments, the biasing can be provided by the accumulator structure itself, e.g. a designed stiffness of a bellows or the like 90.

Figure 12:
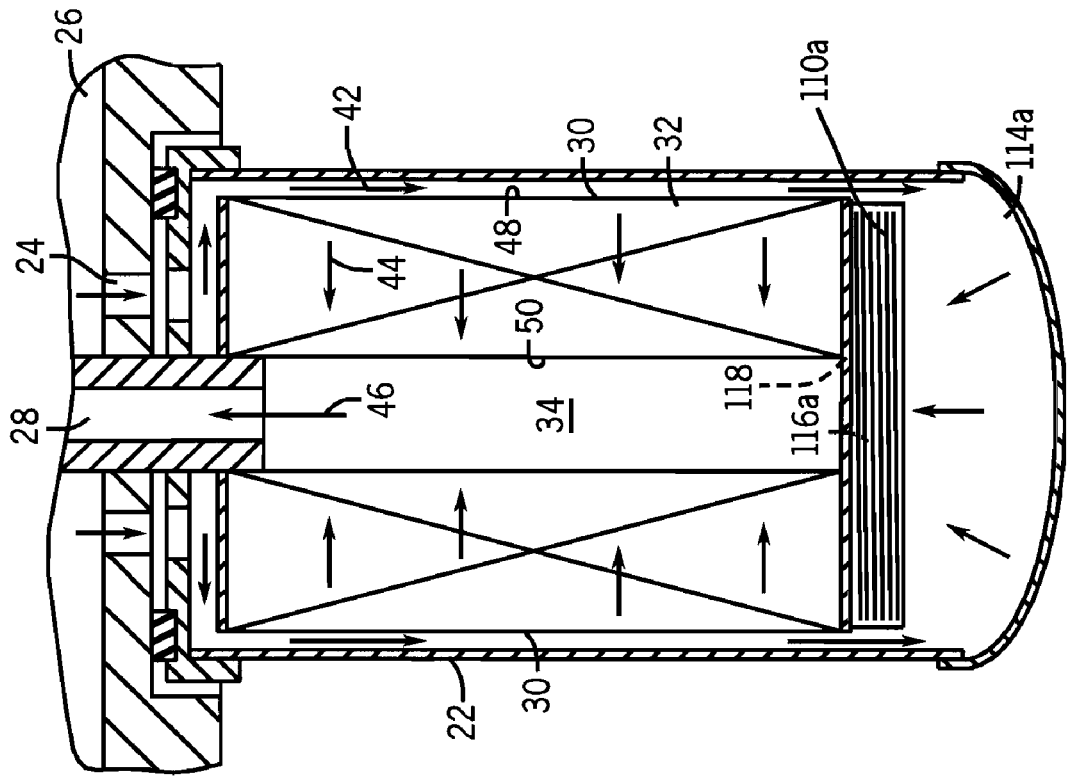
FIG. 12 is like FIG. 11 and shows a further operational condition.
Figure 11:
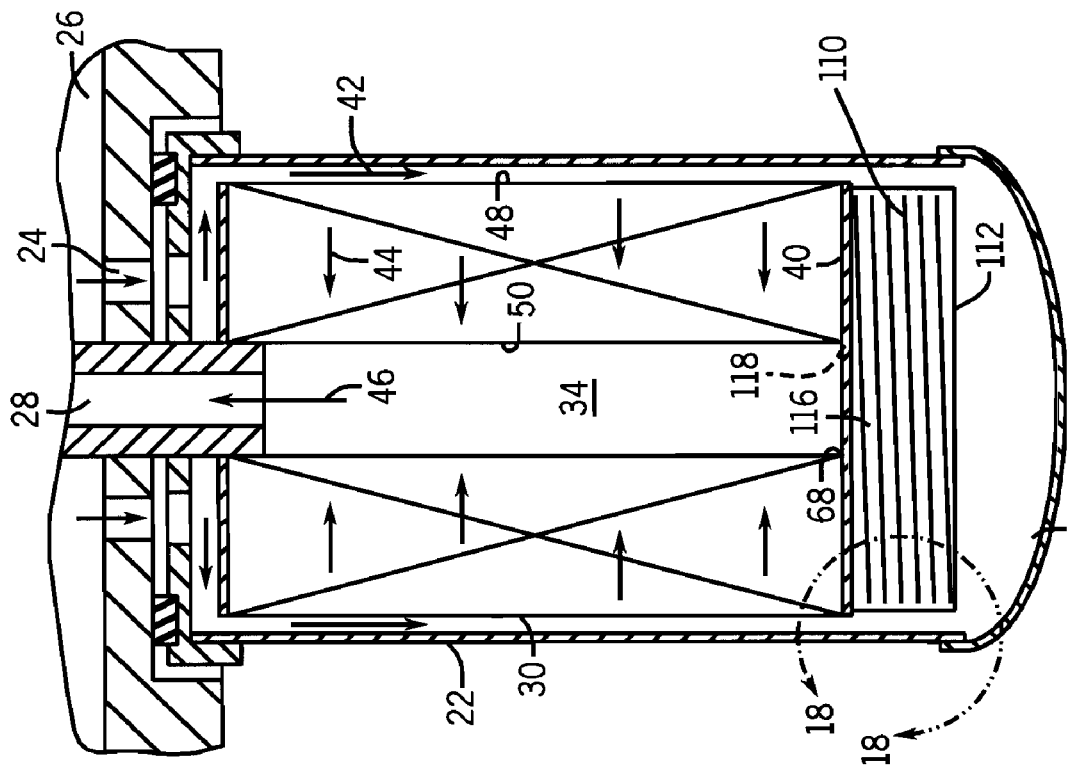
FIG. 11 is like FIG. 1 and shows another embodiment.

FIGS. 11 and 12 show another embodiment and use like reference numerals from above where appropriate to facilitate understanding. The downstream plenum includes an accumulator 110, e.g. a bellows, envelope, bag, etc. Unlike FIG. 9, the accumulator 110 in FIG. 11 has a lower end 112 which is not stationary and is not fixed nor sealed to the housing. In response to a fluid flow surge, accumulator 110 compresses and contracts to the position shown in FIG. 12 at 110*a* to increase the fluid volume of upstream plenum 114 as shown at 114*a* in FIG. 12, and to decrease the fluid volume of the downstream plenum as shown by the downstream plenum section 116 reduced to that shown at 116*a* in FIG. 12. In one embodiment, accumulator 110 is sealed from downstream plenum 34 in the interior of the filter element by a solid lower endcap 40 spanning hollow interior 34.

In another version of the embodiment of FIGS. 11, 12, lower endcap 40 has an aperture as shown in dashed line at 118 therethrough at hollow interior 34 such that the interior of accumulator bag or bellows 10 communicates with hollow interior 34 of the filter element. In this embodiment, accumulator 110 receives clean filtered fluid from downstream side 50 of filter element 30. Accumulator 110 has a normally expanded condition as shown in FIG. 11 at least partially filled with clean filtered fluid in the noted second embodiment. Accumulator 110 has a contracted condition as shown in FIG. 12 discharging clean filtered fluid to downstream side 50 of filter element 30. Accumulator 110 is at lower endcap 40 on the opposite axial side thereof from filter media 32. Upstream plenum 114 is on the lower side of accumulator 110, namely on the opposite axial side of accumulator 110 from lower endcap 40.

Figure 13:
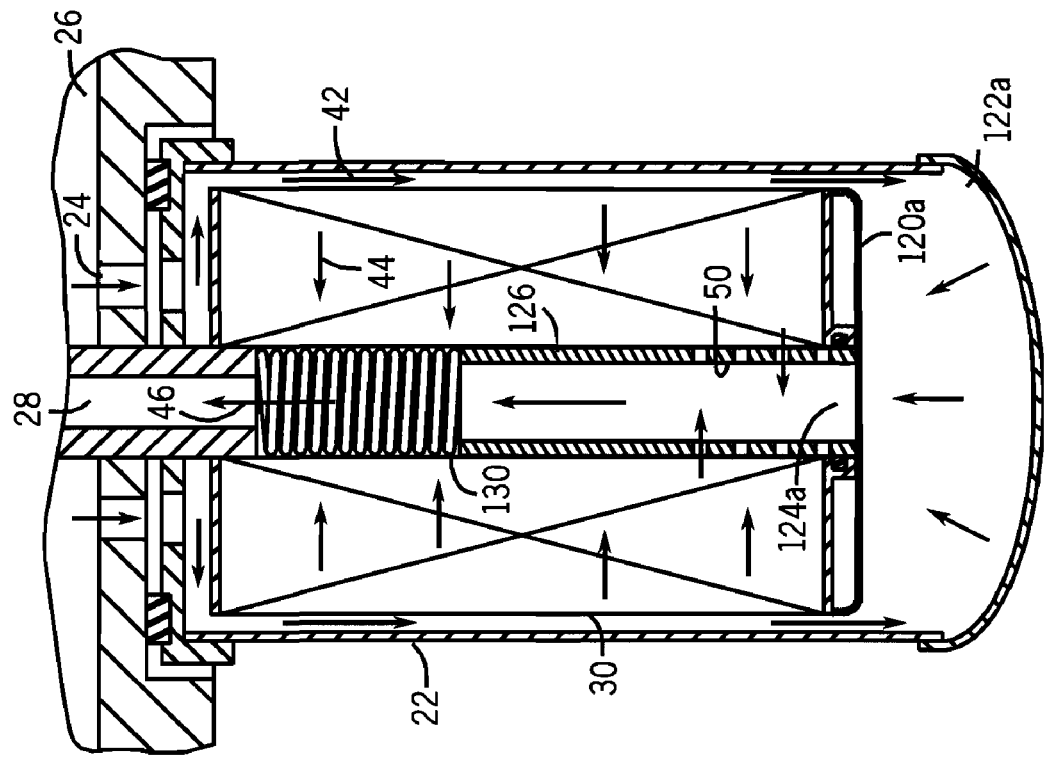
FIG. 13 is like FIG. 1 and shows another embodiment.
Figure 14:
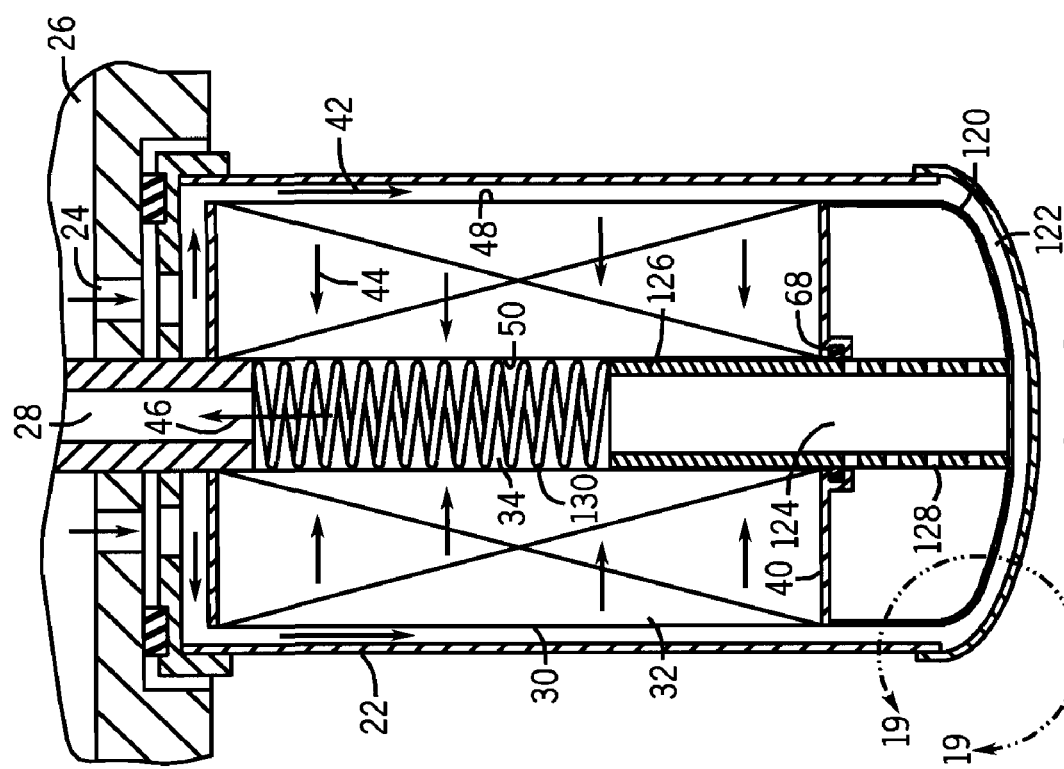
FIG. 14 is like FIG. 13 and shows a further operational condition.

FIGS. 13 and 14 show another embodiment and use like reference numerals from above where appropriate to facilitate understanding. The downstream plenum includes an accumulator 120 responsive to a fluid flow surge to increase the fluid volume of upstream plenum 122 to that shown at 122a in FIG. 14, and decrease the fluid volume of the downstream plenum as shown at downstream section 124 reduced as shown at 124a in FIG. 14. Accumulator 120 receives clean filtered fluid from downstream side 50 of filter element 30. Accumulator 120 has a normally expanded condition as shown in FIG. 13 as least partially filled with clean filtered fluid. The accumulator has a contracted condition as shown in FIG. 14 at 120a discharging clean filtered fluid to downstream side 50 of filter element 30. Endcap 40 has the noted aperture 68 therethrough. Accumulator 120 is at endcap 40 on the opposite axial side thereof from filter media 32. Accumulator 120 communicates with hollow interior 34 through aperture 68. Upstream plenum 122 is on the opposite axial side of accumulator 120 from endcap 40. The accumulator may include an axial standpipe 126 which may be perforated at its lower section as shown at 128. A compression spring 130 biases standpipe 126 downwardly to the position in FIG. 13. When the fluid flow surge overcomes the bias of spring 130, accumulator 120 contracts to the position shown at 120a in FIG. 14 and standpipe 126 moves axially upwardly to the position shown in FIG. 14, to absorb and accommodate the abrupt pressure change and shock wave which would otherwise cause the flow surge to force fluid through or otherwise deleteriously impact against the upstream face of the filter element. It may be desirable that a bias must first be overcome before the noted fluid volume change occurs, i.e. a threshold fluid flow surge must first be experienced.

The system provides a method for protecting a filter against fluid flow surges. The method includes the steps of transferring available fluid volume from the downstream plenum to the upstream plenum in response to a fluid flow surge, whether by an upstream pump causing positive pressure increase at inlet 24, or by a downstream pump causing negative or suction pressure surges at outlet 28, or otherwise by a given pressure differential between inlet 24 and outlet 28 and/or pressure drop across filter element 30. Various methods trade available downstream plenum fluid volume for available upstream plenum fluid volume. In one embodiment, the method includes the step of moving a movable transfer mechanism out of the upstream plenum and into the downstream plenum in response to the fluid flow surge. In a further embodiment, the method includes the step of inversely monotically varying the upstream and downstream plenum fluid volumes relative to each other in response to the fluid flow surge.

In further embodiments, the accumulator includes a bypass passage permitting limited fluid flow therethrough from the upstream plenum to the downstream plenum in response to a given pressure drop across the filter element, to permit limited fluid flow upon plugging of the filter element. Such bypass passage is shown at: axially extended groove or channel or orifice 134 along the exterior surface of piston 70 of FIG. 5 as shown in FIG. 15; hole or orifice 136 in diaphragm 80 of FIG. 7 as shown in FIG. 16; hole or orifice 138 in bellows 90 of FIG. 9 as shown in FIG. 17; hole or orifice 140 in bellows 110 in the apertured version 118 of FIG. 11 as shown in FIG. 18; hole or orifice 142 in envelope or bag 120 of FIG. 13 as shown in FIG. 19. The bypass passage may be provided by a metered flow orifice.

In addition to the noted flow surge protection, the various structures and methods desirably provide vibration dampening. Vibrations from equipment to which a filter is mounted, e.g. an internal combustion engine, a vehicle, or other equipment, can be transferred to the filter and may result in a loss of filtering efficiency. Large amounts of vibration may cause particle re-entrainment back into the fluid being filtered. Additionally, vibration can degrade the structural integrity of the filter and the filtration system. The disclosed flow surge protection systems have the additional benefit of also providing vibration dampening. The various systems provide vibration isolation and dampening between the filter element and housing 22. The compression and expansion of the disclosed accumulators, in addition to the above noted functions, also dampen vibrations in the filter. The vibration dampening accumulators reduce vibration transmission through the mount such as 26 and the housing such as 22 into the filter. The compression and expansion of the accumulators isolate and absorb or minimize the vibration and reduces the transmission of vibration to the filter. The accumulators and the biasing members if used can be modeled in terms of a mass element and an elastic spring element having characteristics selected to provide a degree of vibration isolation at one or more resonant frequencies. These characteristics may be selected to tune the vibration dampening of the accumulators and/or the biasing members to enhance, minimize, or cancel vibration. In an alternative, the vibration tuning can shift the vibration to a different frequency and/or decreasing resonant frequency amplitude in addition to or in lieu of other vibration absorbing or minimizing effects, and can also reduce the adverse affect of sudden impact, mechanical shock, acceleration, etc. The vibration dampening reduces vibration transmission to the filter by absorbing or minimizing vibration at the location where the filter mounts to its mounting interface, and also absorbs or minimizes vibration transmitted to the filter element.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter comprising a housing having an inlet receiving dirty fluid to be filtered, and an outlet discharging clean filtered fluid, a filter element in said housing filtering said fluid, said filter element having an upstream side receiving fluid along an upstream flow path from said inlet, and a downstream side discharging fluid along a downstream flow path to said outlet said housing having an upstream plenum communicating with said upstream side of said filter element, said housing having a downstream plenum communicating with said downstream side of said filter element a resiliently compressible accumulator occupying substantially the entire volume of said upstream plenum and responsive to a fluid flow surge to compress to a smaller volume and increase remaining fluid volume of said upstream plenum, wherein said accumulator comprises a hollow cushioning envelope filled with a compressible medium, said envelope having a normally expanded condition substantially filling said upstream plenum, said envelope having a contracted condition leaving a remainder volume in said upstream plenum between said housing and said envelope, said envelope shrinking from said normally expanded condition to said contracted condition in response to said fluid flow surge.

2. A filter comprising a housing having an inlet receiving dirty fluid to be filtered, and an outlet discharging clean filtered fluid, a filter element in said housing filtering said fluid, said filter element having an upstream side receiving fluid along an upstream flow path from said inlet, and a downstream side discharging fluid along a downstream flow path to said outlet, said housing having an upstream plenum communicating with said upstream side of said filter element, said housing having a downstream plenum communicating with said downstream side of said filter element, a transfer mechanism movable along a given path in response to a fluid flow surge to increase fluid volume of said upstream plenum by reducing fluid volume of said downstream plenum.

3. The filter according to claim 2 wherein said transfer mechanism moves in a direction out of said upstream plenum and into said downstream plenum in response to said fluid flow surge, to transfer available fluid volume from said downstream plenum to said upstream plenum by trading available downstream plenum fluid volume for available upstream plenum fluid volume.

4. The filter according to claim 3 wherein said upstream plenum fluid volume and said downstream plenum fluid volume are inverse monotonic functions of each other in response to movement of said transfer mechanism.

5. The filter according to claim 3 wherein:
said transfer mechanism comprises a movable barrier dividing said upstream and downstream plenums from each other;
said transfer mechanism has an upstream face facing said upstream plenum and contacted by fluid therein;
said transfer mechanism has a downstream face facing said downstream plenum and contacted by fluid therein.

6. The filter according to claim 3 wherein said filter element comprises annular filter media having a hollow interior defining said downstream plenum and extending axially between first and second axially distally opposite endcaps, and said upstream plenum is at one of said endcaps on the opposite axial side thereof from said filter media.

7. The filter according to claim 6 wherein said transfer mechanism and said upstream plenum are at said second endcap.

8. The filter according to claim 7 wherein said second endcap has an aperture therethrough, and said transfer mechanism comprises a piston axially slidable through said aperture and moving in a first axial direction toward said hollow interior to decrease said downstream plenum fluid volume and increase said upstream plenum fluid volume, and moving in a second opposite axial direction away from said hollow interior to increase said downstream plenum fluid volume and decrease said upstream plenum fluid volume.

9. The filter according to claim 8 comprising a biasing member biasing said piston in said second axial direction.

10. The filter according to claim 7 wherein said second endcap has an aperture therethrough, and said transfer mechanism comprises a flexible diaphragm spanning said aperture and flexing in a first axial direction toward said hollow interior to decrease said downstream plenum fluid volume and increase said upstream plenum fluid volume, and flexing in a second opposite axial direction away from said hollow interior to increase said downstream plenum fluid volume and decrease said upstream plenum fluid volume.

11. The filter according to claim 6 wherein said downstream plenum includes a section at said second endcap on the opposite axial side thereof from said filter media.

12. The filter according to claim 11 wherein said upstream plenum is at said first endcap.

13. The filter according to claim 12 wherein:
said first endcap has an aperture therethrough;
said outlet comprises a tube extending axially through said aperture and sealed thereto by a gasket in axially sliding relation;
said upstream plenum is on the opposite axial side of said first endcap from said hollow interior;
said filter element moves in a first axial direction to decrease downstream plenum fluid volume and increase upstream plenum fluid volume;
said filter element moves in a second opposite axial direction to increase downstream plenum fluid volume and decrease upstream plenum fluid volume.

14. A filter comprising a housing having an inlet receiving dirty fluid to be filtered, and an outlet discharging clean filtered fluid, a filter element in said housing filtering said fluid, said filter element having an upstream side receiving fluid along an upstream flow path from said inlet, and a downstream side discharging fluid along a downstream flow path to said outlet, said housing having an upstream plenum communicating with said upstream side of said filter element, said housing having a downstream plenum communicating with said downstream side of said filter element, said downstream plenum including an accumulator responsive to a fluid flow surge to increase fluid volume of said upstream plenum and decrease fluid volume of said downstream plenum.

15. The filter according to claim 14 wherein:
said accumulator receives clean filtered fluid from said downstream side of said filter element;
said accumulator has a normally expanded condition at least partially filled with clean filtered fluid;
said accumulator has a contracted condition discharging clean filtered fluid to said downstream side of said filter element.

16. The filter according to claim 15 wherein:
said filter element comprises annular filter media having a hollow interior defining said downstream plenum and extending axially between first and second axially distally opposite endcaps;
said second endcap has an aperture therethrough;
said accumulator is at said second endcap on the opposite axial side thereof from said filter media;
said accumulator communicates with said hollow interior through said aperture in said second endcap.

17. The filter according to claim 16 wherein said upstream plenum is on the opposite axial side of said accumulator from said second endcap.

18. A filter comprising a housing having an inlet receiving dirty fluid to be filtered, and an outlet discharging clean filtered fluid, a filter element in said housing filtering said fluid, said filter element having an upstream side receiving fluid along an upstream flow path from said inlet, and a downstream side discharging fluid along a downstream flow path to said outlet, said housing having an upstream plenum communicating with said upstream side of said filter element, said housing having a downstream plenum communicating with said downstream side of said filter element, an accumulator responsive to a fluid flow surge to increase the fluid volume of said upstream plenum and decrease the fluid volume of said downstream plenum, said accumulator including a bypass passage permitting limited fluid flow therethrough from said upstream plenum to said downstream plenum in response to a given pressure drop across said filter element.

19. The filter according to claim 18 wherein said accumulator is in said upstream plenum.

20. The filter according to claim 18 wherein said accumulator is in said downstream plenum.

21. The filter according to claim 18 wherein said accumulator comprises a transfer mechanism movable along a given path in response to said fluid flow surge to increase fluid volume of said upstream plenum by reducing fluid volume of said downstream plenum.

22. The filter according to claim 18 wherein said bypass passage comprises a metered flow orifice.

23. A method for protecting a filter element against fluid flow surges, said filter having a housing having an inlet receiving dirty fluid to be filtered, and an outlet discharging clean filtered fluid, a filter element in said housing filtering said fluid, said filter element having an upstream side receiving fluid along an upstream flow path from said inlet, and a downstream side discharging fluid along a downstream flow path to said outlet, said housing having an upstream plenum communicating with said upstream side of said filter element, said housing having a downstream plenum communicating with said downstream side of said filter element, said method comprising transferring available fluid volume from said downstream plenum to said upstream plenum in response to a fluid flow surge, to trade available downstream plenum fluid volume for available upstream plenum fluid volume.

24. The method according to claim 23 comprising providing a movable transfer mechanism, and moving said transfer mechanism out of said upstream plenum and into said downstream plenum in response to said fluid flow surge.

25. The method according to claim 23 comprising inversely monotonically varying said upstream and downstream plenum fluid volumes relative to each other in response to said fluid flow surge.

26. The method according to claim 23 comprising providing a bypass passage and permitting limited fluid flow through said bypass passage from said upstream plenum to said downstream plenum in response to a given pressure drop across said filter element.

\* \* \* \* \*